(12) United States Patent
Yeager et al.

(10) Patent No.: US 10,801,131 B2
(45) Date of Patent: Oct. 13, 2020

(54) ELECTROSPINNING ARAMID NANOFIBERS

(71) Applicant: The Johns Hopkins University, Baltimore, MD (US)

(72) Inventors: Matthew P. Yeager, Washington, DC (US); Christopher M. Hoffman, Jr., Columbia, MD (US); Morgana M. Trexler, Baltimore, MD (US); Zhiyong Xia, Rockville, MD (US)

(73) Assignee: The Johns Hopkins University, Baltimore, MD (US)

( * ) Notice: Subject to any disclaimer, the term of this patent is extended or adjusted under 35 U.S.C. 154(b) by 494 days.

(21) Appl. No.: 15/468,411

(22) Filed: Mar. 24, 2017

(65) Prior Publication Data

US 2017/0342599 A1    Nov. 30, 2017

Related U.S. Application Data

(60) Provisional application No. 62/340,551, filed on May 24, 2016.

(51) Int. Cl.

| | |
|---|---|
| *D01D 5/00* | (2006.01) |
| *D01F 6/60* | (2006.01) |
| *C08G 69/48* | (2006.01) |
| *B29C 48/05* | (2019.01) |
| *B29C 48/00* | (2019.01) |
| *B29C 48/14* | (2019.01) |
| *D01D 1/02* | (2006.01) |

(Continued)

(52) U.S. Cl.
CPC ............ *D01F 6/605* (2013.01); *B29C 48/022* (2019.02); *B29C 48/05* (2019.02); *B29C 48/142* (2019.02); *C08G 69/32* (2013.01); *C08G 69/48* (2013.01); *D01D 1/02* (2013.01); *D01D 5/0038* (2013.01); *B29K 2077/10* (2013.01)

(58) Field of Classification Search
CPC ...... B29K 2077/10; C08G 69/32; D01D 1/02; D01D 5/0038; D01D 5/0046; D01F 6/605
USPC ......................... 264/10, 464, 465, 466, 484
See application file for complete search history.

(56) References Cited

U.S. PATENT DOCUMENTS

| | | | | | |
|---|---|---|---|---|---|
| 4,845,162 | A | * | 7/1989 | Schmitt .................. | C08L 61/06 525/423 |
| 4,894,422 | A | * | 1/1990 | Peiffer ................. | C08G 69/265 524/606 |

(Continued)

FOREIGN PATENT DOCUMENTS

GB    2427382 A  * 12/2006  ............... D01D 5/00

OTHER PUBLICATIONS

Papkov, D., Y. Zou, M.N. Andalib, A. Goponenko, S.Z.D. Cheng, and Y.A. Dzenis, Simultaneously Strong and Tough Ultrafine Continuous Nanofibers, ACS Nano, 2013. 7(4): p. 3324-3331.

(Continued)

*Primary Examiner* — Leo B Tentoni
(74) *Attorney, Agent, or Firm* — Todd R. Farnsworth

(57) ABSTRACT

Example methods and articles of manufacture related to electrospun aramid nanofibers are provided. One example method may include forming a resultant solution by reacting a solution of aramids dissolved in a solvent with an electrophile. In this regard, the electrophile may perform a side chain substitution on the dissolved aramids. The example method may further include electrospinning the resultant solution to form an aramid nanofiber.

20 Claims, 13 Drawing Sheets

(51) Int. Cl.
    C08G 69/32        (2006.01)
    B29K 77/00        (2006.01)

(56) References Cited

U.S. PATENT DOCUMENTS

2013/0288050 A1    10/2013   Arruda et al.
2014/0162063 A1     6/2014   Dzenis
2015/0099185 A1*    4/2015   Joo .................... D01D 5/003
                                                      264/465 X

OTHER PUBLICATIONS

Tanner, D., J.A. Fitzgerald, and B.R. Phillips, The Kevlar Story—an Advanced Materials Case Study, Angewandte Chemie International Edition in English, 1989. 28(5): p. 649-654.
Vaseashta, A., Controlled formation of multiple Taylor cones in electrospinning process, Applied Physics Letters, 2007. 90(9): p. 093115.
Ondarçuhu, T. and C. Joachim, Drawing a single nanofibre over hundreds of microns, EPL (Europhysics Letters), 1998. 42(2): p. 215.
Yang, M., K. Cao, L. Sui, Y. Qi, J. Zhu, A. Waas, E.M. Arruda, J. Kieffer, M.D. Thouless, and N.A. Kotov, Dispersions of Aramid Nanofibers: A New Nanoscale Building Block, ACS Nano, 2011. 5(9): p. 6945-6954.
Huang, Z.-M., Y.Z. Zhang, M. Kotaki, and S. Ramakrishna, A review on polymer nanofibers by electrospinning and their applications in nanocomposites, Composites Science and Technology, 2003. 63(15): p. 2223-2253.
Subbiah, T., G.S. Bhat, R.W. Tock, S. Parameswaran, and S.S. Ramkumar, Electrospinning of nanofibers, Journal of Applied Polymer Science, 2005. 96(2): p. 557-569.
Srinivasan, G. and D.H. Reneker, Structure and morphology of small diameter electrospun aramid fibers, Polymer International, 1995, 36(2): p. 195-201.
Gonzalez, G.M., L.A. MacQueen, J.U. Lind, S.A. Fitzgibbons, C.O. Chantre, I. Huggler, H.M. Golecki, J.A. Goss, and K.K. Parker, Production of Synthetic, Para-Aramid and Biopolymer Nanofibers by Immersion Rotary Jet-Spinning, Macromolecular Materials and Engineering, 2017, 302, 1600365; published online Oct. 7, 2016.
Cao, K., C.P. Siepermann, M. Yang, A.M. Waas, N.A. Kotov, M.D. Thouless, and E.M. Arruda, Reactive Aramid Nanostructures as High-Performance Polymeric Building Blocks for Advanced Composites, Advanced Functional Materials, 2013. 23(16): p. 2072-2080.
Dewilde, S., W. Dehaen, and K. Binnemans, Ionic liquids as solvents for PPTA oligomers, Green Chemistry, 2016. 18(6): p. 1639-1652.
Bair, T.I., P.W. Morgan, and F.L. Killian, Poly( 1,4-phenylene terephthalamides) Polymerization and Novel Liquid-Crystalline Solutions, Macromolecules, 1977. 10(6): p. 1396-1400.
Fonck, E., G.G. Feigl, J. Fasel, D. Sage, M. Unser, D.A. Rufenacht, and N. Stergiopulos, Stroke, 2009. 40: p. 2552-2556.
Calderon-Colon, X., Z. Xia, J.L. Breidenich, D.G. Mulreany, Q. Guo, O.M. Uy, J.E. Tiffany, D.E. Freund, R.L. McCally, O.D. Schein, J.H. Elisseeff, and M.M. Trexler, Structure and properties of collagen vitrigel membranes for ocular repair and regeneration applications, Biomaterials, 2012. 33(33): p. 8286-8295.
Tarus, B., N. Fadel, A. Al-Oufy, and M. El-Messiry, Effect of polymer concentration on the morphology and mechanical characteristics of electrospun cellulose acetate and poly (vinyl chloride) nanofiber mats, Alexandria Engineering Journal, 2016. 55(3): p. 2975-2984.
McCormick, C.L., P.A. Callais, and B.H. Hutchinson, Solution studies of cellulose in lithium chloride and N,N-dimethylacetamide, Macromolecules, 1985. 18(12): p. 2394-2401.
Bauer, F., S. Denneler, and M. Willert-Porada, Influence of temperature and humidity on the mechanical properties of Nafion® 117 polymer electrolyte membrane, Journal of Polymer Science Part B: Polymer Physics, 2005. 43(7): p. 786-795.
Lefebvre, D.R., P.R. Elliker, K.M. Takahashi, V.R. Raju, and M.L. Kaplan, The critical humidity effect in the adhesion of epoxy to glass: role of hydrogen bonding, Journal of Adhesion Science and Technology, 2000. 14(7): p. 925-937.
Murthy, N.S., Hydrogen bonding, mobility, and structural transitions in aliphatic polyamides, Journal of Polymer Science Part B: Polymer Physics, 2006. 44(13): p. 1763-1782.
Noether, H.D., Factors affecting the formation of hard elastic fibers, Polymer Engineering & Science, 1979. 19(6): p. 427-432.
Schroeder, L.R. and S.L. Cooper, Hydrogen bonding in polyamides, Journal of Applied Physics, 1976. 47(10): p. 4310-4317.
Fee, T., S. Surianarayanan, C. Downs, Y. Zhou, and J. Berry, Nanofiber Alignment Regulates NIH3T3 Cell Orientation and Cytoskeletal Gene Expression on Electrospun PCL+Gelatin Nanofibers, PLOS ONE, 2016. 11(5): p. e0154806.
Baji, A., Y.-W. Mai, S.-C. Wong, M. Abtahi, and P. Chen, Electrospinning of polymer nanofibers: Effects on oriented morphology, structures and tensile properties, Composites Science and Technology, 2010. 70(5): p. 703-718.
Huang, C., S. Chen, D.H. Reneker, C. Lai, and H. Hou, High-strength mats from electrospun poly(p-phenylenebiphenyl tetracarboximide) nanofibers, Advanced Materials, 2006. 18(5): p. 668-671.
Pauly, H.M., D.J. Kelly, K.C. Popat, N.A. Trujillo, N.J. Dunne, H.O. McCarthy, and T.L. Haut Donahue, Mechanical properties and cellular response of novel electrospun nanofibers for ligament tissue engineering: Effects of orientation and geometry, J Mech Behav Biomed Mater, 2016. 61: p. 258-270.
Naraghi, M., I. Chasiotis, H. Kahn, Y. Wen, and Y. Dzenis, Novel method for mechanical characterization of polymeric nanofibers, Review of Scientific Instruments, 2007. 78(8): p. 085108.
Bazbouz, M.B. and G.K. Stylios, The tensile properties of electrospun nylon 6 single nanofibers, Journal of Polymer Science Part B: Polymer Physics, 2010. 48(15): p. 1719-1731.
Naraghi, M., S.N. Arshad, and I. Chasiotis, Molecular orientation and mechanical property size effects in electrospun polyacrylonitrile nanofibers, Polymer, 2011. 52(7): p. 1612-1618.
Fei, C., P. Xinwen, L. Tingting, C. Shuiliang, W. Xiang-Fa, H.R. Darrell, and H. Haoqing, Mechanical characterization of single high-strength electrospun polyimide nanofibres, Journal of Physics D: Applied Physics, 2008. 41(2): p. 025308.
Li, L., L.M. Bellan, H.G. Craighead, and M.W. Frey, Formation and properties of nylon-6 and nylon-6/montmorillonite composite nanofibers, Polymer, 2006. 47(17): p. 6208-6217.
Lim, C., E. Tan, and S. Ng, Effects of crystalline morphology on the tensile properties of electrospun polymer nanofibers, Applied Physics Letters, 2008. 92(14): p. 141908.
Cheng, M., W. Chen, and T. Weerasooriya, Mechanical Properties of Kevlar® KM2 Single Fiber, Journal of Engineering Materials and Technology, 2005. 127: p. 97.
Heo, S.J., N.L. Nerurkar, B.M. Baker, J.W. Shin, D.M. Elliott, and R.L. Mauck, Fiber stretch and reorientation modulates mesenchymal stem cell morphology and fibrous gene expression on oriented nanofibrous—microenvironments, Annals of Biomedical Engineering, 2011. 39(11): p. 2780-2790.
Curgul, S. et al., Molecular dynamics simulation of size-dependent structural and thermal properties of polymer nanofibers, Macromolecules 2007, 40, 8483-8489.
Deitzel, J. M. et al., The effect of processing variables on the morphology of electrospun nanofibers and textiles, Polymer 2001, 42(1), 261-272.
Li, D. et al., Electrospinning of Nanofibers: Reinventing the Wheel?, Adv. Mater. 2004, 16, 1151.
Gibson, P. W. et al., Electrospun fiber mats: Transport properties, 1999, 45, 190-195.
Kim, J. S. et al., Mechanical properties of composites using ultrafine electrospun fibers, Polym. Compos. 1999, 20, 124-131.
Hogg, P. J., Composites in armor, Science 2006, 314, 1100-1101.
Jassal, M. et al., Aramid fibres—An overview, Indian J. Fibre Text. 2002, 27, 290-306.

(56) References Cited

OTHER PUBLICATIONS

Takayanagi, M. et al., A New Chemical Method of Surface-Treatment of Kevlar Fiber for Composites with Epoxy Resin, Polym. J. 1987, 19, 467-474.

Takayanagi, M. et al., Syntheses and characterization of N-grafted poly (p-phenylene terephthalamide), J. Polym. Sci. 1983, 21, 31.

Takayanagi, M. et al., Surface-Modified Kevlar Fiber-Reinforced Polyethylene and Ionomer, J. Appl. Polym. Sci., 1982, 27, 3903.

Takayanagi, M., et al., N-Substituted Poly(p-Phenylene Terephthalamide), J. Polym. Sci. 1981, 19, 1133.

Ai, T. et al., Effect of grafting alkoxysilane on the surface properties of Kevlar fiber, Polym. Compos., 2007, 28, 412-416.

Small, Some Factors Affecting the Solubility of Polymers, J. Appl. Chem., 1953, 3, 71-80.

Koenhen et al., The Determination of Solubility Parameters of Solvents and Polymers by Means of Correlations with Other Physical Quantities, J. Appl. Polymer Science, 1975, 19, 1163-1179.

Aharoni, The Solubility Parameters of Aromatic Polyamides, J. Appl. Polymer Science, 1992, 45, 813-817.

Ahmed et al., Microstructural Developments of Poly (p-phenylene terephthalamide) Fibers During Heat Treatment Process: A Review, Materials Research, 2014, 17(5), 1180-1200.

Hoogsteen et al., SAXS experiments on voids in gel-spun polyethylene fibres, 1990, 25, 1551-1556.

Ran et al., Structural changes during deformation of Kevlar fibers via on-line synchrotron SAXS/WAXD techniques, Polymer, 2001, 42, 1601-1612.

Panar et al., Morphology of Poly( p-Phenylene Terephthalamide) Fibers, Journal of Polymer Science: Polymer Physics Edition,1983, 21, 1955-1969.

Morgan et al., The Relationship between the Physical Structure and the Microscopic Deformation and Failure Processes of Poly (p-Phenylene Terephthalamide) Fibers, Journal of Polymer Science: Polymer Physics Edition,1983, 21, 1757-1783.

Dobb et al., Role of microvoids in aramid fibres, Journal of Materials Science, 1992, 27, 3876-3878.

Dobb et al., Structural characteristics of aramid fibre variants, Journal of Materials Science, 1990, 25, 459-464.

\* cited by examiner

| Functional Group Name | Functional Group Structure | Calculated Solubility Parameter, $\delta$ ($MPa^{1/2}$) | DMF, $\Delta\delta$ ($MPa^{1/2}$) | DMAc, $\Delta\delta$ ($MPa^{1/2}$) | NMP, $\Delta\delta$ ($MPa^{1/2}$) |
|---|---|---|---|---|---|
| None | - | 26.0 | 1.2 (-) | 3.3 (-) | 3.1 (-) |
| Methyl |  | 28.0 | 3.2 (-) | 5.3 (-) | 5.1 (+) |
| Propyl |  | 22.8 | 2.0 (+) | 0.1 (+) | 0.1 (+) |
| Allyl |  | 22.6 | 2.2 (+) | 0.1 (+) | 0.3 (+) |
| Pentenyl |  | 23.1 | 1.7 (+) | 0.4 (+) | 0.2 (+) |
| Benzyl |  | 26.9 | 2.1 (-) | 4.2 (+) | 4.0 (+) |
| Hydroxypropyl |  | 22.5 | 2.3 (-) | 0.2 (-) | 0.4 (-) |

| Propyl-Aramid Concentration (wt% in DMF) | Fiber Diameter (nm) |
|---|---|
| 20 | 67.2 ± 21.5 |
| 30 | 149 ± 65.1 |
| 35 | 309 ± 75.8 |
| 40 | 525 ± 121 |
| 50 | 1750 ± 377 |

FIG. 7

ELECTROSPINNING ARAMID NANOFIBERS

CROSS-REFERENCE TO RELATED APPLICATIONS

This application claims the benefit of U.S. Provisional Application No. 62/340,551 filed on May 24, 2016, the entire contents of which are hereby incorporated herein by reference.

GOVERNMENT LICENSE RIGHTS

This invention was made with U.S. government support. The U.S. government has certain rights in the invention.

TECHNICAL FIELD

Example embodiments generally relate to forming polymer nanofibers and, more particularly, relate to methods and articles of manufacture related to electrospinning of polymer nanofibers.

BACKGROUND

The synthesis of one-dimensional (1D) nanostructures has garnered immense interest and research focus. Notably, nanostructures, such as electrospun fibers, have been the subject of much research. However, many current techniques for preparing and electrospinning fibers can have drawbacks including non-uniformities in the fibers and limitations with respect to scalability of such techniques.

BRIEF SUMMARY OF SOME EXAMPLES

Accordingly, some example embodiments are directed to an example method of forming an aramid nanofiber. In this regard, the example method may comprise forming a resultant solution by reacting a solution of aramids dissolved in a solvent with an electrophile. The electrophile may perform a side chain substitution on the dissolved aramids. The example method may further comprise electrospinning the resultant solution to form an aramid nanofiber.

Another example embodiment is an article of manufacture. The article of manufacture may comprise an aramid nanofiber having a diameter less than 100 nanometers and exhibiting a side chain substitution with an electrophile at an amide nitrogen.

BRIEF DESCRIPTION OF THE SEVERAL VIEWS OF THE DRAWING(S)

Having thus described the some example embodiments in general terms, reference will now be made to the accompanying drawings, which are not necessarily drawn to scale, and wherein:

FIG. 7 shows a table relating aramid concentration to fiber diameter according to an example embodiment;

DETAILED DESCRIPTION

Figure 1:
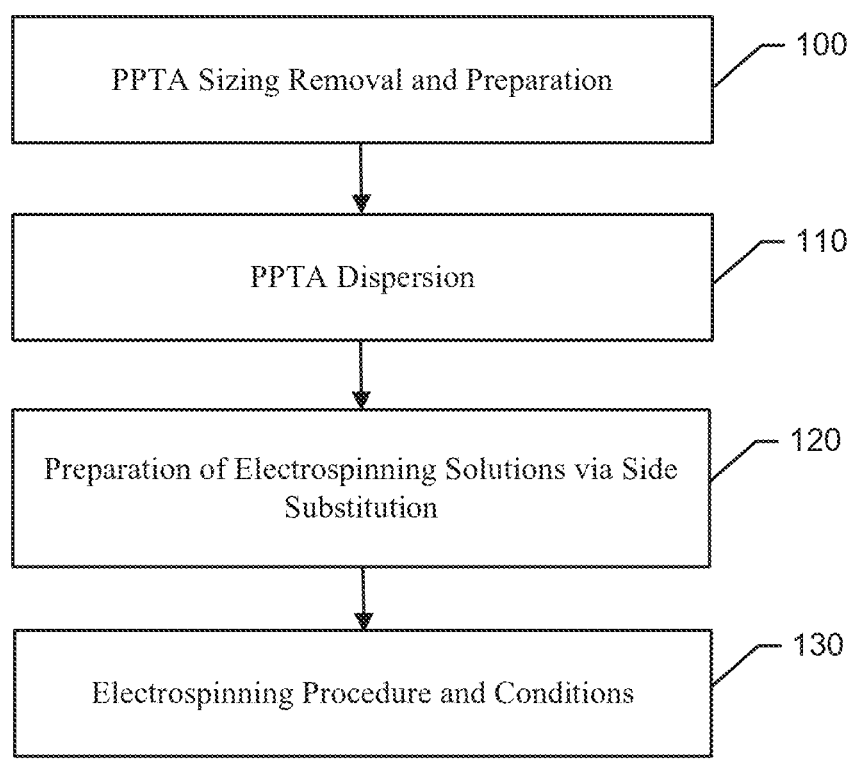
FIG. 1 shows a flow chart of an example method for electrospinning an aramid nanofiber according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

Nanostructures, such as electrospun fibers, have shown a remarkable enhancement in tensile strength and toughness as a function of decreasing radii down to the nanoscale. These characteristics can be attributed to both decreased fiber defects and enhanced nanofiber crystallinity. However, many current techniques for preparing and electrospinning fibers can have drawbacks including non-uniformities in the fibers and limitations with respect to scalability of such techniques. As such, there is a desire for the improvements in the area of electrospun fibers that result in increased fiber uniformity and scalability.

According to various example embodiments, methods and articles of manufacture related to electrospinning aramid nanofibers are provided. Electrospinning may be a manner of forming fibers using electric fields. Aramids are a class of synthetic, heat-resistant fibers that exhibit relatively high tensile strengths. Examples of aramids, such as Kevlar®, may include, for example, poly(para-phenylene terephthalamide) (PPTA) polymers.

Conventional techniques for electrospinning aramid fibers have involved dissolving the aramids with concentrated sulfuric acid prior to electrospinning. However, such techniques have been found to yield non-uniform fibers that could not be produced on a large scale. Because aramid fibers, such as PPTA fibers, demonstrate superior mechanical properties and chemical resistance due to enhanced interchain cohesion through extensive hydrogen bonding interactions, a scalable method for uniformly electrospinning aramid nanofibers without treatment in sulfuric acid is of significant interest.

Therefore, according to some example embodiments, side chain substitutions may be introduced to the aramids that enhance polymer solubility in organic solvents to support continuous electrospinning of aramid nanofibers. The utilization of side chain substitutions, according to various example embodiments, has resulted in increased uniformity in the nanofibers and provided for increased production scalability. Semi-empirical solubility studies have corroborated the solubility effects of such side chain substitutions. Electrospun aramid nanofibers that are developed in accordance with the side chain substitution techniques described herein can be characterized via scanning electron microscopy (SEM) imaging and Fourier transform infrared spectroscopy (FTIR), x-ray powder diffraction (XRD), and nuclear magnetic resonance spectroscopy (NMR) analyses to confirm occurrence of side chain substitution and small-angle x-ray scattering to determine morphology and crystalline/amorphous domains of resulting nanofibers.

According to some example embodiments, a practical, scalable method for the production of uniform, nanoscale fibers of functionalized aramids, such as PPTA, is provided. The example method may be utilized to prepare various N-functionalized aramid nanofibers on a multi-gram scale. The resulting aramid nanofiber crystalline structure can be analyzed via XRD and SAXS, with the result revealing that the functionalized aramid nanofibers consist of non-oriented crystalline domains surrounded by large amorphous regions that lack the microvoid defects seen in commercial Kevlar® fibers.

Example embodiments will now be described using PPTA as the aramid and the raw starting aramid being a standard fiber (e.g., 850 denier). However, one of skill in the art would appreciate that other aramids may be utilized in place of PPTA to achieve similar results and that the raw starting aramid may be in any form factor such as fibers, pellets, sheets, or the like. Further, the description of example embodiments may also indicate specific quantities and durations that can be used in the example method. However, one of skill in the art would appreciate that the specific quantities may be scaled to achieve similar results.

According to an example method, the following materials may be used: poly(para-phenylene terephthalamide) (PPTA) fiber in the form of Kevlar® KM2 yarn (850 denier); Dimethyl sulfoxide (DMSO; 99.9%; anhydrous); N,N-dimethylformamide (DMF; 99.8%; anhydrous); N,N-dimethylacetamide (DMAc; 99.8%; anhydrous); N-methyl-2-pyrrolidinone (NMP; 99.5%; anhydrous); sodium hydride (NaH; 95%; dry); potassium hydride (KH; 30%; dispersed in mineral oil); potassium hydroxide (KOH; 99.9%); 1-bromopropane (99%); 3-bromo-1-propene (99%); 5-bromo-1-pentene (95%); bromoethylbenzene (99%); iodomethane (99%). However, one of skill in the art would appreciate that variations of these materials may be used to obtain similar results.

According to some example embodiments, an example method shown in FIG. 1 for forming aramid nanofibers may include PPTA sizing removal and preparation at 100. In this regard, standard sized PPTA fibers (e.g., 850 denier) may be provided. Prior to PPTA dispersal and functionalization, protective fiber sizing and residual moisture can be removed from the PPTA by first soaking the PPTA in methanol for, for example, 12 hours. Subsequently, the PPTA/methanol soak may be vacuum dried at, for example, 60° C. for 8 to 12 hours or overnight. Thermogravimetric analysis may also be conducted to confirm the removal of native moisture within the PPTA.

The example method may then proceed with PPTA dispersion at 110, which may be performed in a number of ways. In this regard, the PPTA may be dispersed using a hydroxide, such as KOH, or a hydride (e.g., an alkali hydride), such as, NaH or KH. The different dispersion reagents have different, for example, strength bases and result in different dispersion times.

Figure 2:
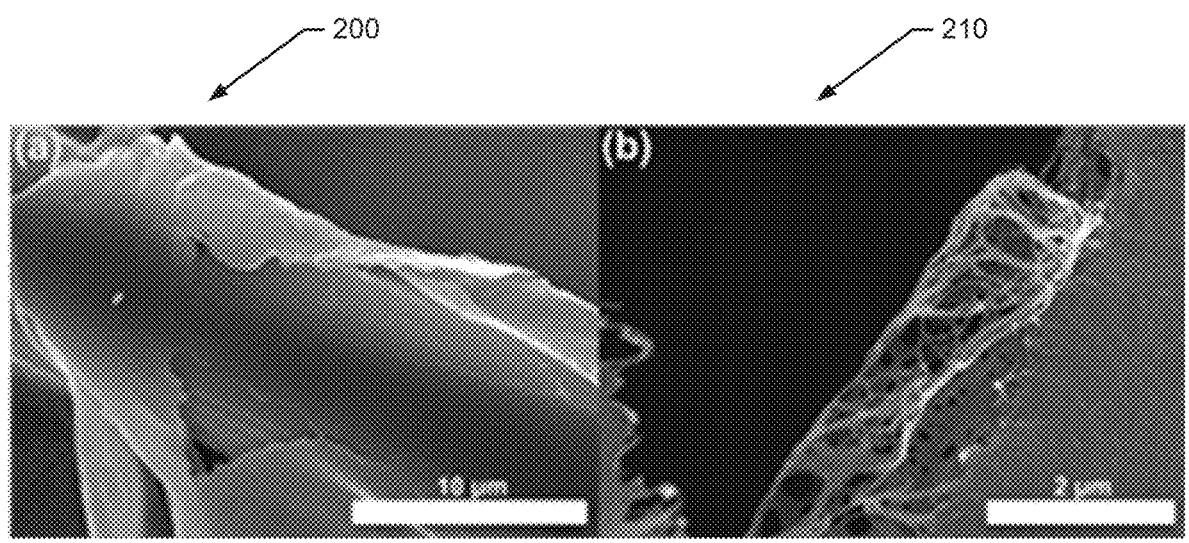
FIG. 2 shows images of poly(para-phenylene terephtalamide) (PPTA) dispersions according to an example embodiment.

In an example embodiment where KOH is used, for example, 3.0 grams (g) of PPTA may be dissolved in 500 milliliters (mL) of DMSO using 3.0 g KOH over the course of 7-10 days in a closed, but ambient atmospheric environment (e.g., temperature between 20° C. and 25° C., absolute pressure of 1 atm (14.696 psi), and relative humidity of 30% or above) to form a dark red solution. The dark red solution may then be decanted into a separate reaction vessel, e.g., a flask, to remove excess KOH, leaving a viscous dispersion of metalated PPTA. In this regard, FIG. 2 shows the changes to the PPTA fibers during the KOH dispersion. Image 200 shows the DMSO/KOH dispersal of PPTA fibers after approximately 50 hours, illustrating the amorphous skin delamination from the inner core region of a single fiber. Additionally, image 210 shows a fully dispersed fiber in the DMSO/KOH solution. These images were achieved by drying small aliquots of the respective dispersals on 200-mesh, copper transmission electron microscopy grids.

Alternatively, a hydride, such as NaH may be used as a dispersion reagent. Using sodium hydride (NaH) in, for example, a glove box under an argon atmosphere, 1.0 g of NaH may be added to 600 mL of DMSO and stirred for approximately 1 hour until the solution cools to room temperature (between 20° C. and 25° C.) after completion of the exothermic reaction. This reaction may form a DMSO solution of highly basic reagent sodium methylsulfinylmethylide (NaDMSO). Subsequently, 2.0 g of dried PPTA fibers may be added, portion wise, over the course of 1 hour with continuous stirring. The DMSO/NaDMSO/PPTA solution may be stirred for 16 hours, after which an orange-colored solution may be formed. The solution may be exposed to ambient atmospheric conditions (e.g., temperature between 20° C. and 25° C., absolute pressure of 1 atm (14.696 psi), and relative humidity of 30% or above) and stirred for another 1 to 2 hours. During this stage, complete dispersal of PPTA fibers may be achieved upon the absorption of atmospheric water into the basic solution, which may be evidenced by the formation of a dark red dispersion.

Figure 3:
FIG. 3 shows a PPTA-hydride reaction according to an example embodiment.

With reference to FIG. 3, the overall reaction of the hydride-based method, in this case an NaH-based method, for achieving PPTA dispersions is shown. In this regard, the PPTA 300 is reacted with the highly basic DMSO solution and water (e.g., from the atmosphere). The result may be a complete dispersal and the creation of a hydroxyl anion formation 310.

Similar to the dispersion employing NaH, KH may be used as the dispersion reagent. In this regard, 1.67 g of KH may be first washed with hexanes and then added to 600 mL DMSO under an argon atmosphere to form a potassium methylsulfinylmethylide (KDMSO) solution. This solution may heat up due to the exothermic reaction and may be allowed to cool to room temperature (between 20° C. and 25° C.) and 3.0 g of dried PPTA fibers may be added portion wise to the basic solution and stirred for 4 hours to form a solution that is opaque orange. The opaque orange solution may then be removed from the inert environment and exposed to the ambient atmosphere (e.g., temperature between 20° C. and 25° C., absolute pressure of 1 atm (14.696 psi), and relative humidity of 30% or above) and stirred for an additional 2 hours to achieve full dispersal.

Upon formation of the dispersion, further preparations of electrospinning solutions may be undertaken at 120. According to some example embodiments, this may be referred to as N-functionalization via, for example, nucleophilic side chain substitution. The dissolved PPTA/DMSO solution, for example, may be reacted with an electrophile resulting in side chain substitutions to the PPTA/DSMO solution. In this regard, for example, an alkyl electrophile, having, for example, a leaving group of bromine or iodine, may be used in the reaction and the result may be stirred for 24 hours. During this time, the solution color may change from dark red to transparent yellow, which may be indicative of the non-resonance associated with side chain substitution at the amide nitrogen, which may operate to substantially decrease viscosity.

Figure 4:
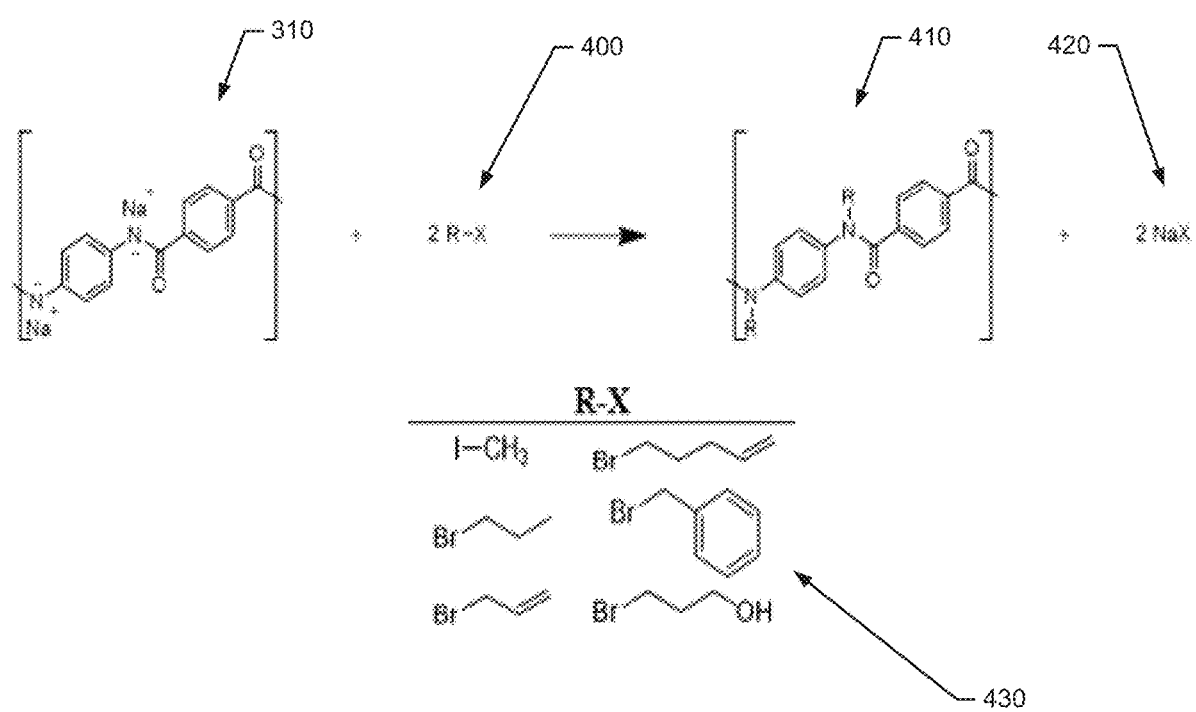
FIG. 4 shows a PPTA-dimethyl sulfoxide (DMSO) electrophile side chain substitution reaction according to an example embodiment.

With reference to FIG. 4, this reaction is shown as the hydroxyl anion formation 310 resulting from the polyanionic aramid dispersion in DSMO being reacted with an electrophile 400 to obtain the side chain substitution aramid 410 and a by-product 420. Table 430 provides some example electrophiles that may be used which include methyl iodide, 1-bromopropane, allyl bromide, 5-bromo-1-pentene, benzyl bromide, and 3-bromo-1-propanol.

The resulting transparent yellow solution may then be dried via, for example, vacuum distillation. Alternatively, after stirring the solution with the electrophile (e.g., 1-bromopropane) for approximately 24 hours, 500 mL of water may be added causing a solid precipitate to form. The solution may then be vacuum filtered to yield a yellow solid.

The solid (obtained from either vacuum distillation or water precipitation) may then be rinsed two times with 250 mL of water and once with 250 mL of acetone. The solid may then be dried in a vacuum oven overnight. Subsequently, the solution may then be dissolved in approximately 20 mL of solvent (e.g., DMF, DMAc and/or NMP) and dried to remove the solvent. The drying may be performed via a rotary evaporator. Dispersion may then be performed in a solvent (e.g., DMF, DMAc and/or NMP) and drying may be again performed (e.g., via rotary evaporation) to ensure adequate DMSO removal.

The dried result may be dissolved once more to obtain the desired polymer solution concentration (e.g., 20-50 percent by weight). Subsequently, the desired polymer solution may be subjected to sonication and centrifugation, for example, at 14,000 g for 30 minutes to remove all excess salts and form a resultant solution or supernatant.

At 130, the example method may include the conditions and procedures for electrospinning. In this regard, electrospinning may be performed using a power supply (e.g., Bertan Series 230) and a stationary aluminum foil target. The resultant solution may be pumped from a syringe pump (e.g., New Era NE-1000) through a 22-gauge, blunt-tip stainless steel needle. The electrospinning conditions may be a voltage of 20 kilovolts (kV), a volumetric flow rate of 0.1 mL/hour and a collector distance of 10 centimeters.

As mentioned above, the resultant aramid nanofibers may be characterized via SEM, imaging and FTIR spectroscopy, XRD, and NMR spectroscopy analyses to show the side chain substitution and to determine morphology and crystalline/amorphous domains of resulting nanofibers. Via SEM, the diameter of a resultant aramid nanofiber may be measured and experimental results have indicated that nanofibers having diameters on the order of 30 nanometers (nm) (with a range of 2 microns to 10 nm) have been produced.

The dispersion of the aramids in DMSO, in accordance with the operation at 110, may be possible because deprotonation of the polymer backbone amides can disrupt the interfiber hydrogen-bonding network responsible for backbone adhesion. Isolating the deprotonated nanofibers from the basic DMSO dispersion may be problematic as the removal of the DMSO solvent from the basic dispersion by, for example, vacuum distillation which may form a brittle red solid of the metalated (i.e. deprotonated) polymer that is insoluble in organic solvents. The addition of water or acid to the DMSO can cause precipitation of the completely insoluble PPTA because reintroduction of hydrogen bonding can result in the immediate aggregation of aramid nanofibers into an unworkable mat. Further, alkylation of the deprotonated amide site of the aramid dispersion can result in a rapid drop in solution viscosity with a concomitant color change to transparent yellow, indicative of functionalization.

Figure 5:
FIG. 5 shows a solubility parameter table according to an example embodiment.
Figure 5:
Figure 5:
Figure 5:
Figure 5:
Figure 5:

To increase solubility, side-chains with various structures may be utilized to determine the effect of size/length, n-bonds and hydrogen bonds on the solubility and morphology of the resulting fibers. The selection of side groups and solvents may be aided by considering theoretical solubilities. The solubility parameter for each functionalized aramid type can be estimated and compared to those of the solvents, as provided in the table of FIG. 5. In this regard, the table shows N-functional groups used for enhancing aramid solubility, with the solubility parameter ($\delta$) and the solvent compatibility ($\Delta\delta$ being the absolute difference between solvent and aramid solubility parameters, where (+) indicates soluble and (−) indicates insoluble). The solubility parameters of DMF, DMAc and NMP are 24.8, 22.7, and 22.9 MPa$^{1/2}$, respectively. The solubility parameter, $\delta_i$, of functionalized polymers may be found as:

$$\delta_i = \frac{\sum F_i}{\hat{V}} \quad (1)$$

where $F_i$ is the molar-attraction constant of the polymeric moieties, given in cal$^{1/2}$ mL$^{1/2}$, and $\hat{V}$ is the polymer molar volume (mL mol$^{-1}$). For adequate solubility, the difference of solubility parameter between polymer and solvent can often be less than 0.5 MPa$^{1/2}$. However, factors including temperature, side chain size, and polarity can cause that threshold to vary.

In practice, some discrepancies have been observed between expected and realized solubilities. The calculated solubility parameters suggested a preferred solubility for propyl-, allyl-, pentenyl- and hydroxypropyl-aramid nanofibers in DMAc and NMP solvents. Allyl, propyl, and pentenyl-functionalized fibers are soluble in DMF, DMAc and NMP. Methyl- and benzyl-aramid nanofibers were expected to be generally insoluble in all three spinning solvents, but were successfully dispersed and electrospun in NMP alone or DMAc and NMP, respectively. Benzyl side chains demonstrated solubility in DMAc or NMP as the solvent, whereas methyl-functionalized fibers needed the higher boiling point of NMP for solvation. These unexpected insolubilities are likely due to effects of hydrogen bonding, polarity and functional group size that are not captured by the calculations. Fibers functionalized with hydroxypropyl quickly precipitated out of DMSO and had difficulties being dissolved in any organic solvent. Hydroxypropyl-aramids seemed to be generally insoluble, which is likely attributed to the additional hydrogen bonding that was unaccounted for in the molar-attraction values.

Despite the lack of strict correlation between calculated and observed solubilities, equation (1), above, provides guidance on which side chain-solvent combinations to pursue. In order to better understand the polymer solubility dynamics and control the resulting fiber morphology and crystalline properties, different functional groups, degrees of functionalization and combinations of functional groups may be used for electrospinning.

Figure 6:
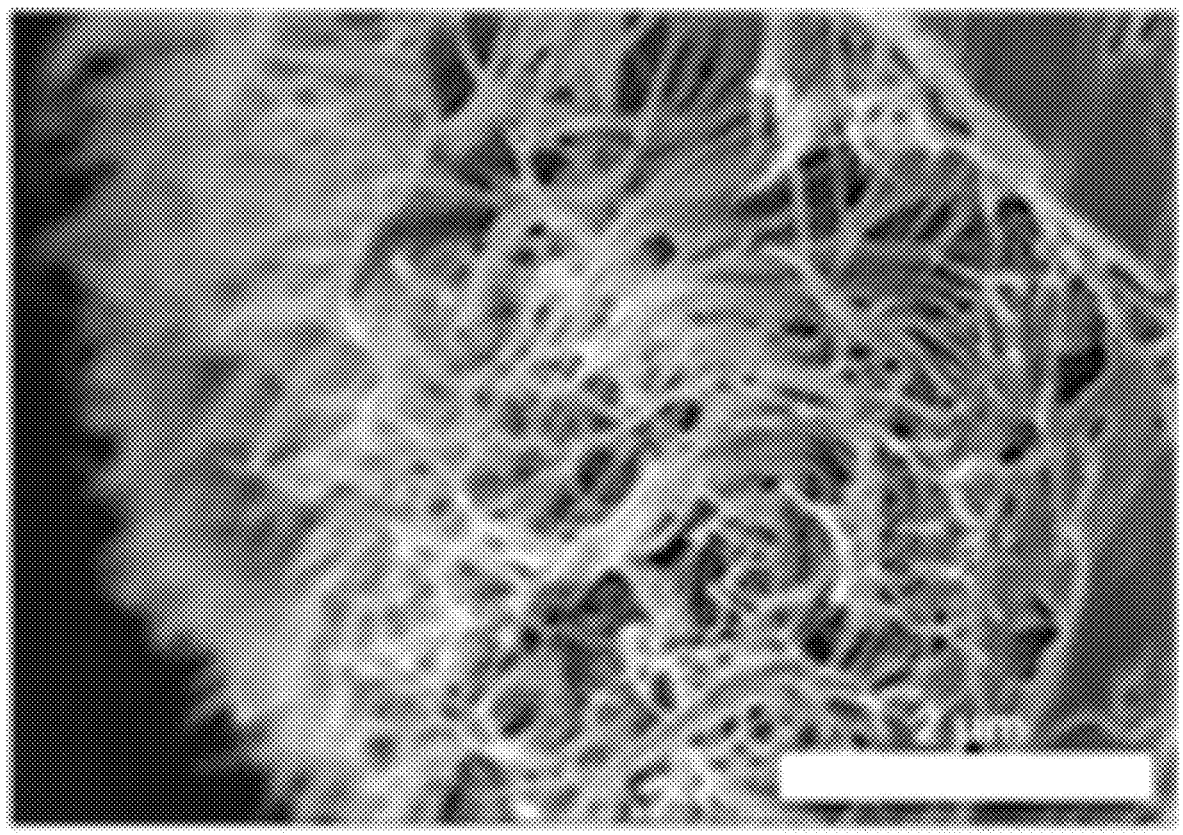
FIG. 6 shows an image of functionalized aramids according to an example embodiment.

According to some example embodiments, as described with respect to preparation for electrospinning at 120, functionalized aramid dispersions can be vacuum distilled and dispersed to concentrations up to 50 percent by weight (% wt) in organic solvents (e.g., DMF, DMAc and/or NMP) to be suitable for electrospinning. Functionalized aramids prepared for electrospinning, as shown in FIG. 6, can be comparable in size to unfunctionalized fibers that are similarly dried from DMSO dispersions. In this regard, FIG. 6 shows aramids after functionalization with an electrophile that is 1-bromopropane. The functionalized aramids may then be dispersed in DMF and dried for comparison with unfunctionalized-aramids dried from a basic DMSO dispersion as shown in 210 of FIG. 2. Comparing FIG. 2 with FIG. 6 shows that both the functionalized PPTA and the dried DMSO solutions are made up of nanofibers of roughly the same diameter. Accordingly, the functionalization did not destroy the nanofibers in the dispersion.

Figure 8:
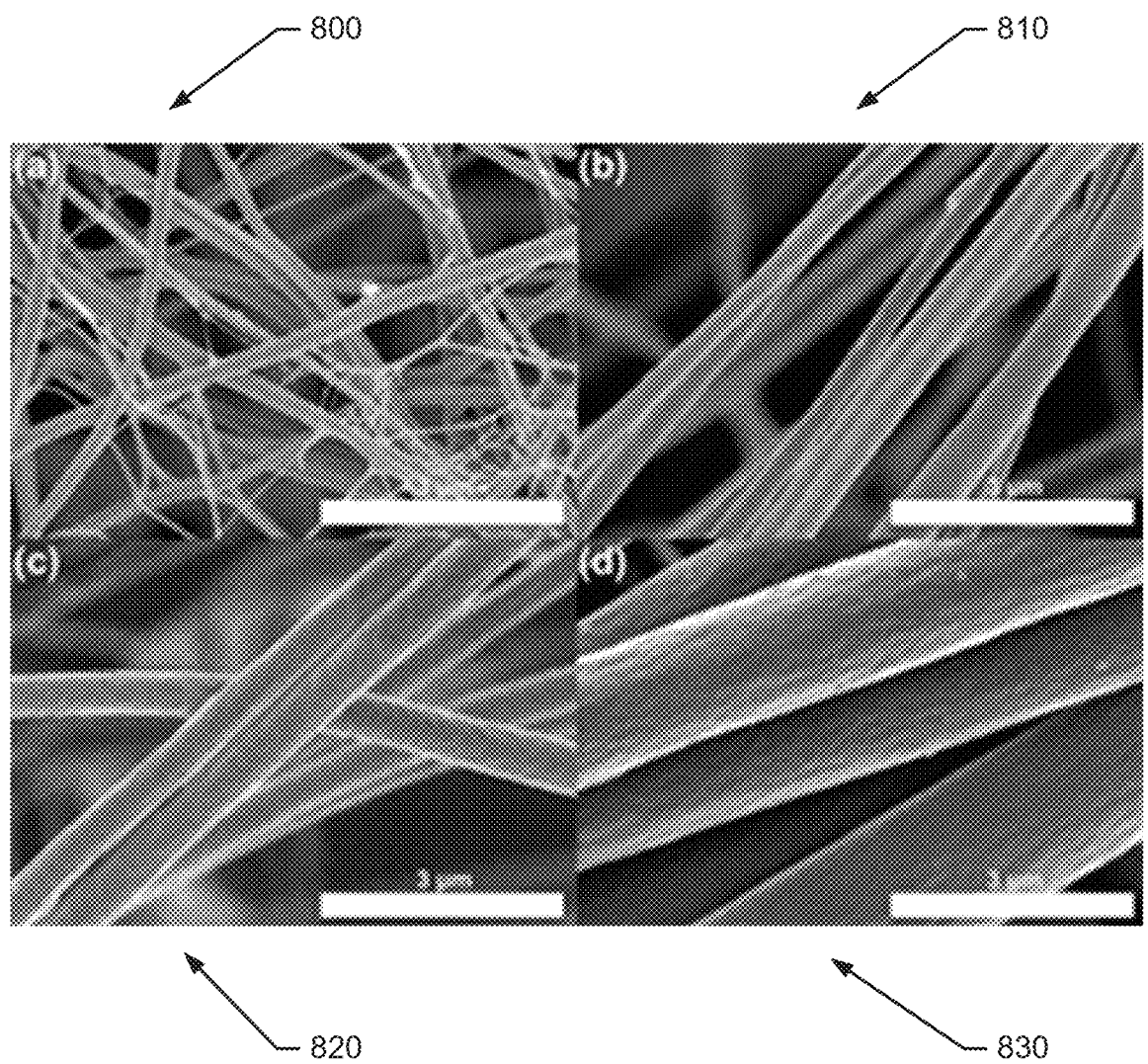
FIG. 8 shows images of electrospun aramid nanofibers of differing diameters according to an example embodiment.

With respect to electrospinning at 130, polymer concentrations in the range of 20 to 50% wt can yield nanofibers, with fiber diameters increasing with increasing spinning solution concentration. The table of FIG. 7 shows fiber diameters that can be achieved with differing solution concentrations. Relatively low volumetric flow rates (e.g., 0.1 mL/hr) may be used with a high electric field (e.g., 20 kV at 10 cm spinning distance) to consistently obtain functionalized aramid nanofibers with high uniformity. FIG. 8 shows images of electrospun aramid nanofibers according to some example embodiments. In this regard, aramid nanofibers spun from DMF-based solutions having a polymer concentration of 20% wt at 800, 30% wt at 810, 35% wt at 820, and 50% wt at 830. Furthermore, in some instances, electrospun functionalized aramid nanofibers may be significantly larger in diameter than the fibers of the parent spinning solution (e.g., a solution in DMF/DMAc/NMP that nanofibers are spun from), which suggests that single electrospun fibers are composed of multiple aramid nanofibers of smaller diameter. As shown in FIG. 6, the dried parent solution is made up of dispersed nanofibers. After electrospinning, nanofibers of significantly larger diameter are obtained, meaning that the electrospun fiber includes bundles of smaller diameter nanofibers. While it has been generally shown that smaller fiber diameters enhance fiber strength and stiffness, the ability to produce fibers at varying diameters may allow for optimal spinning efficiency and manipulation into the desired form factor.

Figure 9:
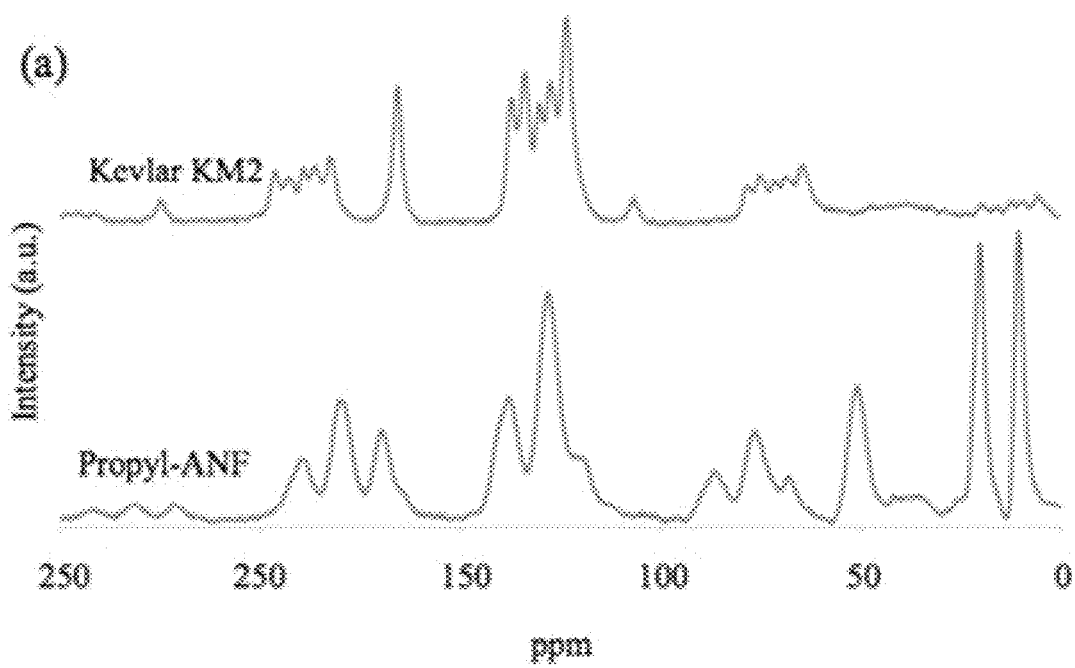
FIG. 9 shows a nuclear magnetic resonance spectroscopy (NMR) spectral chart of an aramid nanofiber according to an example embodiment.

Chemical and structural characterization of the aramid nanofibers formed based on example embodiments has also been performed. $^{13}$C solid-state (ss) NMR and $^1$H solution NMR in d-DMSO were conducted to provide insight into the molecular structure of the functionalized aramid nanofibers, and to confirm proper substitution of the side groups onto the polymer chain. Analyses of propyl-functionalized aramid nanofibers determined that three aliphatic carbons are present in the propyl-aramid nanofiber, that are not present in the original aramids used to initiate the example method. With reference to the spectral chart of FIG. 9, the three aliphatic carbons present in the propyl-aramid nanofiber sample that were not present in the ssNMR of the Kevlar® KM2, indicated by the three broad peaks at 50, 20 and 10 ppm.

Figure 10:
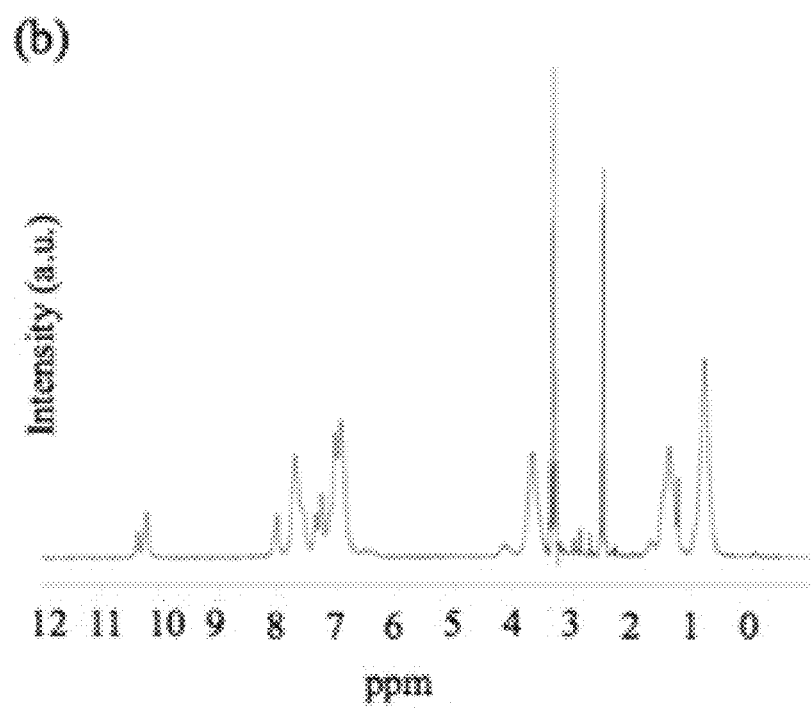
FIG. 10 shows a NMR spectral chart of an aramid-DMSO solution according to an example embodiment.
Figure 11:
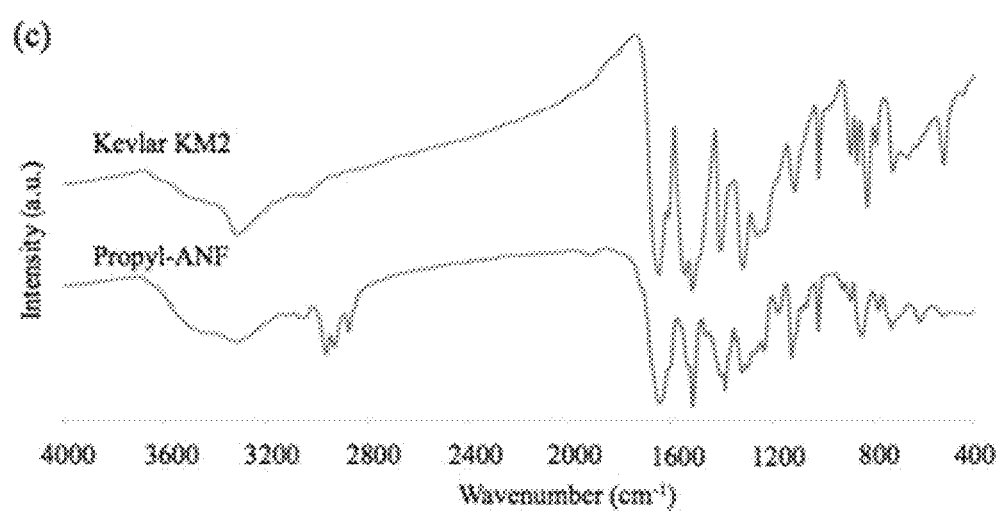
FIG. 11 shows a Fourier transform infrared spectroscopy (FTIR) spectral chart of an aramid nanofiber according to an example embodiment.

Additionally, proton NMR analyses indicated the presence of an aliphatic propyl group. This is shown in the chart of FIG. 10 by the three broad peaks centered at 3.7, 1.4 and 0.8 ppm which are indicative of the presence of an aliphatic propyl group. Further, the presence of C—H stretching peaks (3000-2800 cm$^{-1}$) in the FTIR spectra, as shown in the chart of FIG. 11, is indicative of the presence of propyl functionality, which was associated with a decrease in N—H stretching intensity (3325 cm$^{-1}$) relative to, for example, the Kevlar® KM2 spectrum. The remaining presence of a N—H stretching peak in the propyl-aramid nanofiber spectrum is consistent with the findings from the elemental analyses that showed 71.3±0.2% of propyl-aramid nanofiber amides were alkylated. The results of these analyses therefore confirmed that functionalization reactions occurred.

Figure 12:
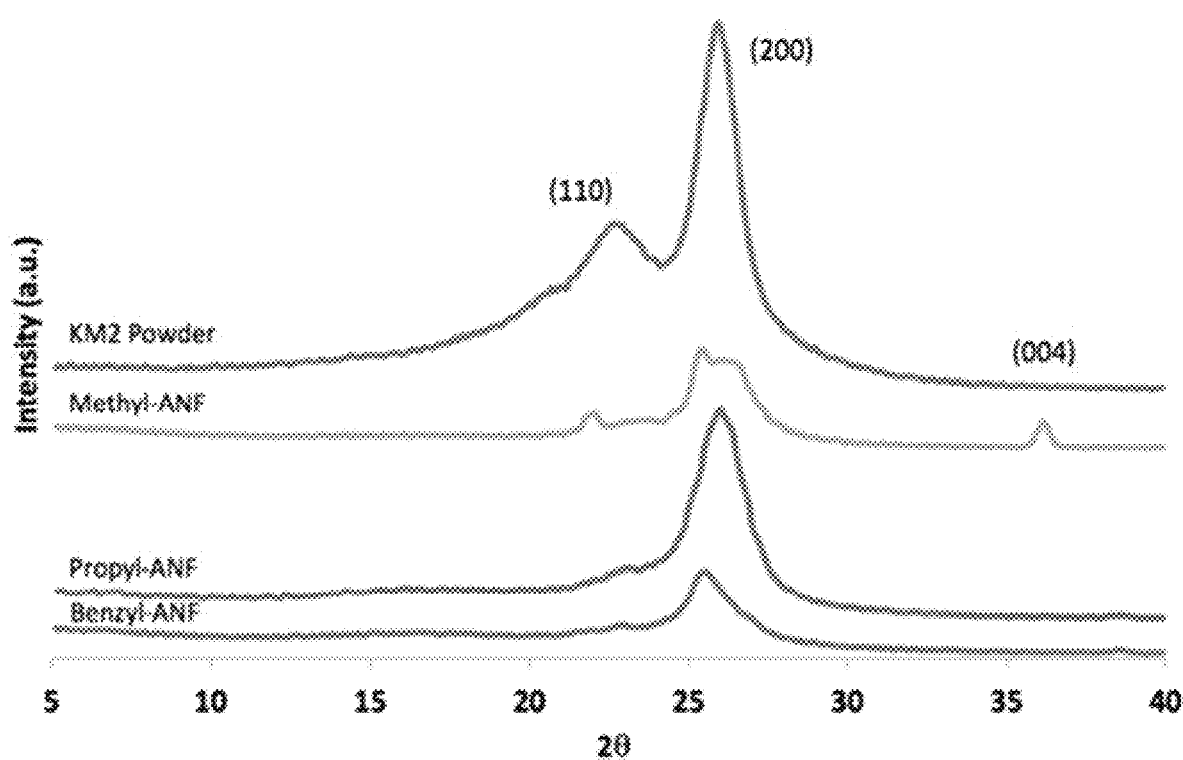
FIG. 12 shows an x-ray powder diffraction (XRD) spectral chart of aramid nanofibers according to an example embodiment.

Additionally, XRD can be utilized to investigate variations in resulting fiber crystallinity as a function of side group functionalization and spinning conditions. In this regard, with reference to FIG. 12, the XRD spectrum for Kevlar® KM2 reveals a monoclinic crystal structure, including (110) and (200) reflectance peaks. The methyl-aramid nanofibers, spun from NMP, demonstrate (110), (200) and (004) reflection peaks (~20-22°, ~26-28° and ~36-37°, respectively), whereas propyl- and benzyl-aramid nanofibers spun from DMF and DMAc, respectively, demonstrate reflection peaks at (200). Based on this data, XRD spectra of electrospun methyl-, propyl- and benzyl-functionalized aramid nanofibers show a maintained long-chain order in the crystalline regions, but without clear chain orientation due to disruption in transverse periodicity, perhaps due to the bulkier side chain moieties. This shows that some of the structure of Kevlar® is retained, but not all.

Figure 13:
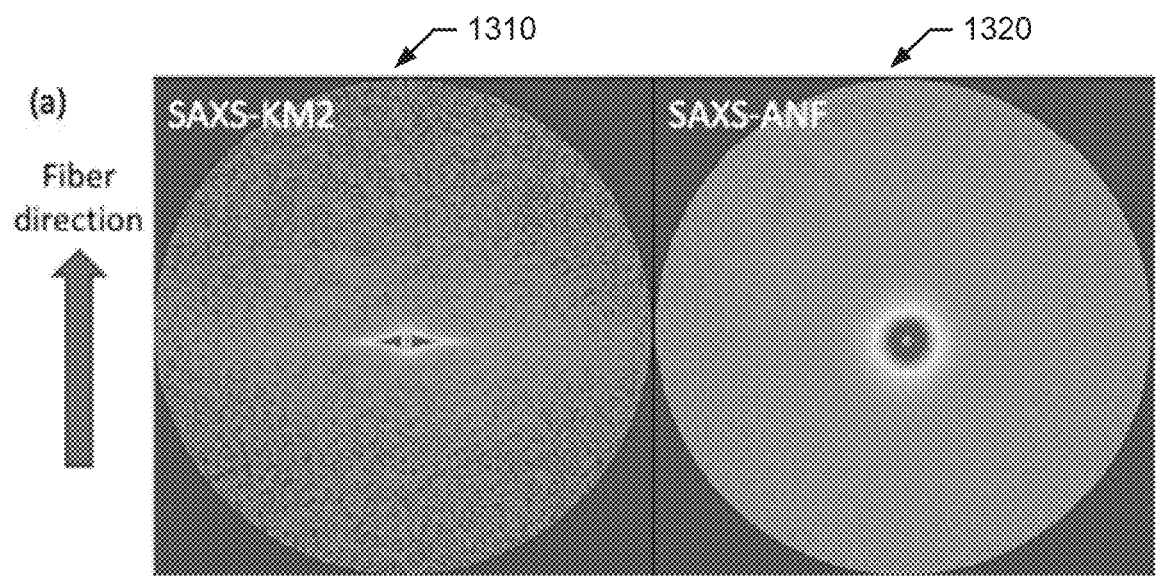
FIG. 13 shows a small-angle x-ray scattering SAXS spectral chart of an aramid nanofiber according to an example embodiment.

Furthermore, in order to understand the fiber morphologies on the order of a few-to-several hundred nanometers, SAXS may be performed on both the Kevlar® KM2 and the resulting propyl-aramid nanofibers, spun from DMF. The 2D SAXS patterns are shown in FIG. 13. The SAXS spectra for the Kevlar® KM2 control sample at 1310 shows a strong equatorial diffraction streak that is indicative of a microfibrillar superstructure containing microvoids, which are generally present in the amorphous region of the fiber. These microvoids are a natural and unavoidable result of the dry jet-wet spinning process, and may be detrimental to fiber performance by providing failure initiation sites. Conversely, the treated aramid nanofibers, according to various example embodiments, do not demonstrate void scattering along the equatorial region as shown at 1320, thereby indicating a loss in both the oriented fibrillar and microvoid morphologies due to the effects of the N-substitution. This loss of fibrillar orientation is consistent with the presence of only (200) XRD reflections in the treated aramid nanofibers.

Figure 14:
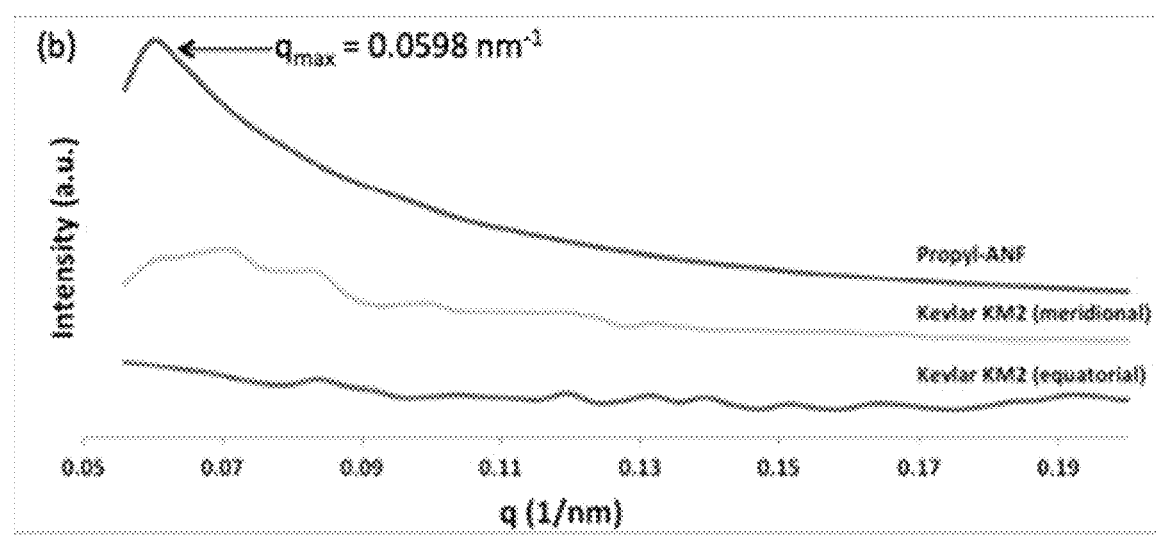
FIG. 14 shows an integrated one-dimensional spectral chart of an aramid nanofiber according to an example embodiment.

Furthermore, the fiber long period, $L_p$, calculated using the first maximum of the scattering vector:

$$L_p = \frac{2\pi}{q_{max}} \quad (2)$$

results in a value of 105 nm (where $q_{max}=0.0598$ nm$^{-1}$) for the propyl-aramid nanofibers, as provided in the chart of FIG. 14. Kevlar® KM2 exhibited an $L_p$ of 87 nm, a value consistent with literature and unique to the defect band structure of aramids. The relatively higher value for the long period for propyl-aramid nanofibers suggests an increase in the overall size of the amorphous region of the fibers, which may be devoid of microvoids or other imperfections that are detrimental to the fiber performance.

In combination with the XRD results, these SAXS results indicate that functionalized aramid nanofibers are comprised of long-chain, non-oriented crystalline domains separated by larger amorphous regions that lack the microvoid defects observed in the commercial Kevlar®. The microvoids present in commercial Kevlar® are known to be an unavoidable result of the conventional coagulation bath step of the dry wet-jet spinning method. Conversely, electrospinning of functionalized aramid nanofibers can result in fibers with amorphous regions that do not contain undesirable microvoids, likely due to the rapid solvent evaporation that occurs during the electrospinning process. Further tuning the crystallite sizes and orientation by tailoring side chain moieties and electrospinning conditions may further optimize the structures of these nanofibers, potentially leading to defect free and highly crystalline structures, and therefore high strength/stiffness nanofibers. When materials are made at smaller scales there may be fewer defects. With fewer defects, the properties are improved. For example, the removal of amorphous region defects and tunable crystallite sizes, in combination with the aforementioned benefits of decreased fiber diameters, may lead to better fiber performance than standard Kevlar®.

Based on the forgoing example method further example methods and articles of manufacture are provided. In this regard, an example article of manufacture is an aramid nanofiber. The aramid nanofiber may have a diameter that is less than 100 nanometers, and according to some example embodiments, between 2 microns and 10 nanometers. Further, the aramid nanofiber may exhibit a side chain substitution with an electrophile. The side chain substitution may occur at an amide nitrogen. Further, additionally or alternatively, the aramid nanofiber may include non-oriented crystal domains. Additionally or alternatively, the aramid nanofiber may have an absence of microvoid defects. Further, according to some example embodiments, the aramid nanofiber may comprise poly(para-phenylene terephthalamide) (PPTA).

Figure 15:
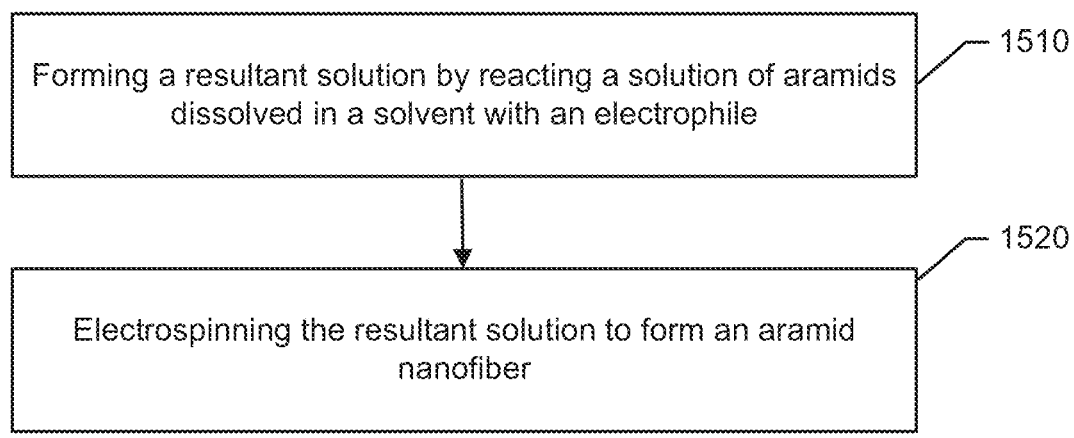
FIG. 15 shows a flow chart of an example method for electrospinning aramid nanofibers according to an example embodiment.

Additionally, with reference to the flow chart of FIG. 15, another example method may be provided. The example method may include, at 1510, forming a resultant solution by reacting a solution of aramids dissolved in a solvent with an electrophile. The electrophile may react to perform a side chain substitution on the dissolved aramids. At 1520, the example method may further include electrospinning the resultant solution to form an aramid nanofiber.

According to some example embodiments, the side chain substitution of 1510 may occur at an amide nitrogen of a molecule of the dissolved aramids. Further, the aramids may comprise poly(para-phenylene terephthalamide) (PPTA). According to some example embodiments, the electrophile may comprise an alkyl electrophile. According to some example embodiments, the solvent may include dimethyl sulfoxide.

Furthermore, forming the resultant solution at 1510 may comprise dissolving the solution reacted with the electrophile to form a second solution that is 20 to 50 percent by weight of aramids. Additionally or alternatively, according to some example embodiments, forming the resultant solution at 1510 may further comprise forming a dispersion of the aramids, and absorbing water into the dispersion. Further, forming the dispersion may comprise dissolving the aramids in dimethyl sulfoxide using a hydroxide or a hydride. Additionally or alternatively, forming the dispersion may comprise dissolving the aramids in dimethyl sulfoxide using sodium hydride or potassium hydride. Forming the resultant solution at 1510 may, according to some example embodiments, further comprise forming a solid precipitate by adding water to the solvent, and removing solid precipitate from the solvent by vacuum filtering. According to some example embodiments, forming the resultant solution at 1510 may further comprise removing at least some of the solvent via vacuum distilling. Forming the resultant solution at 1510 may, according to some example embodiments, further comprise dissolving the solution reacted with the electrophile to obtain a desired polymer concentration for the resultant solution. Further, forming the resultant solution at 1510 may further comprise vacuum distilling the solution reacted with the electrophile to form a second solution, dissolving the second solution in a second solvent to form a third solution, and removing the solvent from the third solution using a rotary evaporator to form the resultant solution. According to some example embodiments, the second solvent may be N,N-dimethylformamide, N,N-dimethylacetamide, or N-methyl-2-pyrrolidinone.

According to some example embodiments, electrospinning at 1520 may further comprise electrospinning the resultant solution using a 10 to 20 kilovolts potential and 0.05 to 0.1 milliliters per hour flow rate. Additionally or alternatively, electrospinning at 1520 may further comprise electrospinning the resultant solution with a 10 cm distance between an electrospinning needle and a target.

Accordingly, the techniques described herein provide practical and scalable techniques for producing uniformly sized, nanoscale fibers of N-functionalized poly(para-phenylene terephthalamide) nanofibers on a multi-gram scale. These nanofibers include non-oriented crystalline domains surrounded by large amorphous regions without the microvoid defects seen in current commercially available nanofibers. Further, the techniques described herein provide for uniformly electrospinning N-functionalized poly(para-phenylene terephthalamide) nanofibers without sulfuric acid. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed is:

1. A method comprising:
   forming a resultant solution by reacting a solution of aramids dissolved in a solvent with an electrophile, the electrophile performing a side chain substitution on the dissolved aramids; and
   electrospinning the resultant solution to form an aramid nanofiber, wherein forming the resultant solution comprises dissolving the solution reacted with the electrophile to form a second solution that is 20 to 50 percent by weight of aramids.

2. The method of claim 1, wherein the side chain substitution occurs at an amide nitrogen of a molecule of the dissolved aramids.

3. The method of claim 1, wherein the aramids comprise poly(para-phenylene terephthalamide) (PPTA).

4. The method of claim 1 wherein the electrophile is an alkyl electrophile.

5. The method of claim 1 wherein electrospinning further comprises electrospinning the resultant solution using a 10 to 20 kilovolt potential and 0.05 to 0.1 milliliters per hour flow rate.

6. The method of claim 1 wherein electrospinning further comprises electrospinning the resultant solution with a 10 cm distance between an electrospinning needle and a target.

7. A method comprising:
   forming a resultant solution by reacting a solution of aramids dissolved in a solvent with an electrophile, the electrophile performing a side chain substitution on the dissolved aramids, wherein forming the resultant solution further comprises:
      forming a dispersion of the aramids, and
      absorbing water into the dispersion;
   and
   electrospinning the resultant solution to form an aramid nanofiber.

8. The method of claim 7, wherein forming the dispersion comprises dissolving the aramids in dimethyl sulfoxide using a hydroxide or a hydride.

9. The method of claim 7 wherein forming the dispersion comprises dissolving the aramids in dimethyl sulfoxide using sodium hydride or potassium hydride.

10. The method of claim 1 wherein the solvent is dimethyl sulfoxide.

11. The method of claim 1, wherein forming the resultant solution further comprises:
    forming a solid precipitate by adding water to the solvent; and
    removing solid precipitate from the solvent by vacuum filtering.

12. The method of claim 1 wherein forming the resultant solution further comprises removing at least some of the solvent via vacuum distilling.

13. The method of claim 1 wherein forming the resultant solution further comprises dissolving the solution reacted with the electrophile to obtain a desired polymer concentration for the resultant solution.

14. A method comprising:
    forming a resultant solution by reacting a solution of aramids dissolved in a solvent with an electrophile, the electrophile performing a side chain substitution on the dissolved aramids, wherein forming the resultant solution further comprises:
       vacuum distilling the solution reacted with the electrophile to form a second solution,
       dissolving the second solution in a second solvent to form a third solution, and
       removing the solvent from the third solution using a rotary evaporator to form the resultant solution; and
    electrospinning the resultant solution to form an aramid nanofiber.

15. The method of claim 14 wherein the second solvent is N,N-dimethylformamide, N,N-dimethylacetamide, or N-methyl-2-pyrrolidinone.

16. The method of claim 7, wherein the side chain substitution occurs at an amide nitrogen of a molecule of the dissolved aramids.

17. The method of claim 7, wherein the aramids comprise poly(para-phenylene terephthalamide) (PPTA).

18. The method of claim 7, wherein the solvent is dimethyl sulfoxide.

19. The method of claim 14, wherein the aramids comprise poly(para-phenylene terephthalamide) (PPTA).

20. The method of claim 14, wherein the electrophile is an alkyl electrophile.

* * * * *